(12) United States Patent
Sasage et al.

(10) Patent No.: US 8,171,248 B2
(45) Date of Patent: May 1, 2012

(54) STORAGE SYSTEM CONTROLLING METHOD, SWITCH DEVICE AND STORAGE SYSTEM

(75) Inventors: Koutarou Sasage, Kawasaki (JP); Kenichi Fujita, Kawasaki (JP); Atsushi Masaki, Kawasaki (JP); Akira Satou, Kawasaki (JP); Hiroshi Shiomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 12/369,616

(22) Filed: Feb. 11, 2009

(65) Prior Publication Data

US 2009/0222632 A1  Sep. 3, 2009

(30) Foreign Application Priority Data

Feb. 29, 2008 (JP) .................. 2008-049719

(51) Int. Cl.
*G06F 12/00* (2006.01)
*G06F 13/00* (2006.01)
*G06F 13/28* (2006.01)

(52) U.S. Cl. .................. 711/165; 711/114

(58) Field of Classification Search .............. 711/114, 711/165

See application file for complete search history.

(56) References Cited

U.S. PATENT DOCUMENTS

| 7,472,240 | B2 * | 12/2008 | Matsunami et al. | 711/162 |
|---|---|---|---|---|
| 2003/0191904 | A1 | 10/2003 | Iwami et al. | |
| 2003/0221074 | A1 | 11/2003 | Satoyama et al. | |
| 2005/0138184 | A1 * | 6/2005 | Amir | 709/228 |
| 2006/0047923 | A1 | 3/2006 | Kodama | |
| 2006/0107010 | A1 * | 5/2006 | Hirezaki et al. | 711/165 |
| 2007/0067593 | A1 | 3/2007 | Satoyama et al. | |
| 2008/0140906 | A1 * | 6/2008 | Serizawa et al. | 711/6 |
| 2008/0184068 | A1 * | 7/2008 | Mogi et al. | 714/15 |

FOREIGN PATENT DOCUMENTS

| JP | 2003-296037 A | 10/2003 |
|---|---|---|
| JP | 2003-345525 A | 12/2003 |
| JP | 2006-72981 A | 3/2006 |
| JP | 2007-115221 A | 5/2007 |

* cited by examiner

*Primary Examiner* — Jared Rutz
*Assistant Examiner* — Ryan Bertram
(74) *Attorney, Agent, or Firm* — Fujitsu Patent Center

(57) ABSTRACT

A method for controlling a storage system having first and second switches and a storage device connected to the switches via a network in response to a request from a host, the storage device having first and second areas, each of the first and second switch accessing to the first and second area, the method includes, receiving a request for copying data stored in the first area to the second area from the host, transmitting initiation notification of the copying to the second switch, executing the copying by the first switch, maintaining progress status of the copying, controlling the second switch to refer to the progress upon receiving a request for access to the first or second area by the host before completion of the copying, and determining whether to permit access to the first or second area by the second switch.

4 Claims, 9 Drawing Sheets

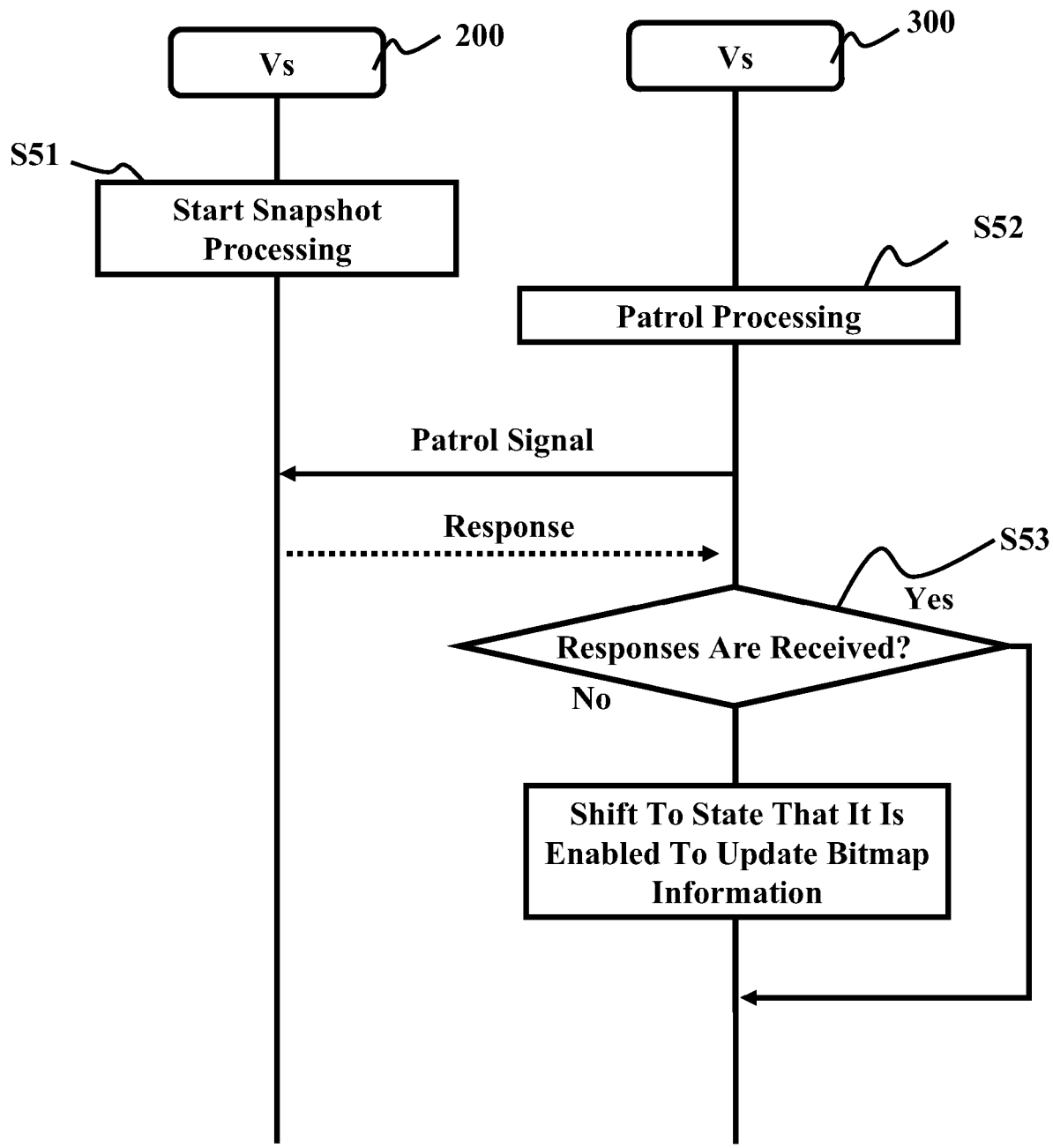

STORAGE SYSTEM CONTROLLING METHOD, SWITCH DEVICE AND STORAGE SYSTEM

CROSS-REFERENCE TO RELATED APPLICATION

This application is based upon and claims the benefit of priority of the prior Japanese Patent Application No. 2008-49719, filed on Feb. 29, 2008, the entire contents of which are incorporated herein by reference.

FIELD

This art relates to a control method for a storage system for storing data.

BACKGROUND

There is a storage system including multiple host apparatus and multiple storage devices connected over a network through switch devices. In the storage system, the host apparatus and the storage devices exchange data. The switch devices in the storage system are connected redundantly for higher fault tolerance.

The technology for effectively using storage areas of storage devices in the storage system may include a virtualization technology for storage apparatus. The virtualization of storage devices may be managed through switch devices. The management of virtualization of storage devices through switch devices allows a combination of multiple storage devices and reduction of management of storage devices in the host apparatus. A technique related to the above techniques is discussed in Japanese Laid-open Patent Publication No. 2006-72981.

The switch devices may perform snapshot processing that copies the state of data at a certain point, which is stored in a virtual storage area, to another virtual storage area. In the snapshot processing, the completion of the copying is notified without waiting for the completion of the processing of copying real data. After the notification, the switch device performs actual copy processing.

For that reason, even during the snapshot processing by one switch device, the other switch devices can access the storage area being the subject of the snapshot processing, which may cause inconsistency in the data in the target storage area.

SUMMARY

According to an aspect of an embodiment, a method for controlling a storage system having first and second switches and a storage device connected to the switches via a network in response to a request from a host, the storage device having first and second areas, each of the first and second switch accessing to the first and second area, the method includes, receiving a request for copying data stored in the first area to the second area from the host, transmitting initiation notification of the copying to the second switch, executing the copying by the first switch, maintaining progress status of the copying, controlling the second switch to refer to the progress upon receiving a request for access to the first or second area by the host before completion of the copying, and determining whether to permit access to the first or second area by the second switch.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 9 is a sequence diagram in a case where the virtualization switch device has an abnormality.

DESCRIPTION OF EMBODIMENTS

With reference to drawings, an aspect of an embodiment will be described below.

Figure 1:
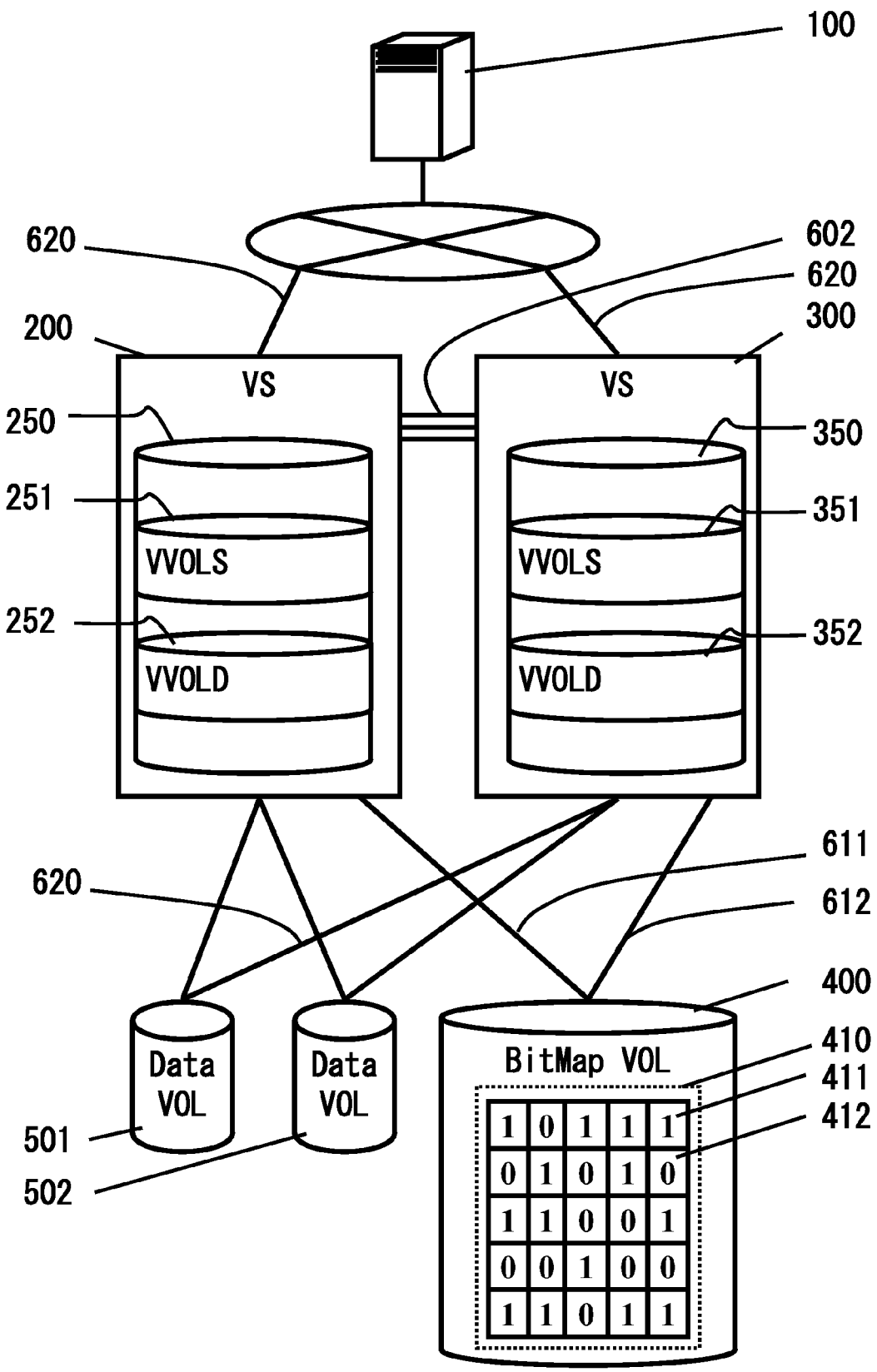
FIG. 1 shows a storage system according to the aspect of an embodiment.

FIG. 1 is a storage system according to the aspect of an embodiment. The storage system of this embodiment includes a host apparatus 100, a virtualization switch device 200, and a virtualization switch device 300, a storage device 501, a storage device 502 and a bitmap information storage unit 400, which are connected mutually. The host apparatus 100 and the virtual switch devices 200 and 300 and the virtualization switch devices 200 and 300 and the storage devices 501 and 502 are connected via a fibre channel.

The host apparatus 100 provides processing and a service to another computer, not shown, over a network.

The virtualization switch devices 200 and 300 manage the exchange of data between the host apparatus 100 and the storage devices 501 and 502. It is assumed that the virtualization switch devices 200 and 300 in the system of this embodiment can virtualize the storage devices 501 and 502. The virtualization of the storage devices through the virtualization switch devices allows the management of a virtual storage area including a combination of multiple storage devices. Therefore, the storage areas of the storage devices can be used effectively. The virtualization of the storage devices through the virtualization switch devices only requires the host apparatus 100 to access the virtual storage area, which may facilitate the management of the storage devices 501 and 502 by the host apparatus 100. The virtualization switch devices 200 and 300 manage virtual storage area information on a combination of storage areas of the multiple storage devices, virtual volume information defined within the virtual storage area and relationship information between virtual volumes and the host apparatus 100. For higher fault tolerance, the virtualization switch devices 200 and 300 redundantly connect the host apparatus 100 and the storage devices 501 and 502. The virtualization switch devices 200 and 300 for the redundant connection store virtual storage area information, virtual volume information and relationship information such that identical access results can be obtained even when the host apparatus 100 accesses any one of the virtualization switch devices 200 and 300.

The virtualization switch devices 200 and 300 are connected such that the host apparatus 100 and the storage device 501 and the storage device 502 can be connected through multiple paths (redundant). The virtualization switch device 200 and the virtualization switch device 300 may be connected over a local area network (LAN) 602. Employing the LAN 602 for connecting the virtualization switch devices 200 and 300 as the multiple communication paths can increase the fault tolerance between the virtualization switch devices 200 and 300.

The storage devices 501 and 502 receive and store write data transmitted from the host apparatus 100 through the virtualization switch device 200 or 300. If a read request transmitted from the host apparatus 100 is received through the virtualization switch device 200 or 300, the storage devices 501 and 502 then reads out the corresponding data and transmits it to the host apparatus 100 through the virtualization switch device 200 or 300.

The virtualization switch devices 200 and 300 manage a virtual data storage area corresponding to the data storage areas of the storage devices 501 and 502. The host apparatus 100 accesses the virtual data storage area. The virtualization switch device 200 or 300 accesses the data storage area of the storage device 501 or 502 corresponding to the virtual data storage area accessed from the host apparatus 100.

Now, the virtualization of storage devices will be described. The virtualization of storages handles multiple physical storage devices as one virtual disk space. The virtual disk space allows the host apparatus 100 to use a data storage area without limiting to the physical data storage areas of the physical storage devices 501 and 502. For example, a manager of a storage system may define a partial data storage area of the virtual disk space as a virtual volume.

The virtualization switch device 200 causes the host apparatus 100 to recognize the defined virtual volume. The virtualization switch device 200 has information associating the host apparatus 100 and the virtual volume and information associating the virtual volume and the data storage area of the storage device 501 or 502. Based on the information, the virtualization switch device 200 accesses the data storage area of storage devices 501 and 502 corresponding to the accessed virtual volume according to the access from the host apparatus 100 to the virtual volume.

In this way, the host apparatus 100 can access the virtual volume in the same manner as the access to a normal storage device through a storage virtual module 211 of the virtualization switch device 200.

Next, the virtual disk space and virtual volumes will be described which are managed by the virtualization switch devices 200 and 300. FIG. 1 shows virtual disk spaces 250 and 350 managed by the virtualization switch devices 200 and 300. The virtual disk spaces 250 and 350 are common to the virtualization switch devices 200 and 300. The virtual disk spaces 250 and 350 associate with the data storage area of the storage device 501 and the data storage area of the storage device 502.

In the virtualization of the storage devices of this embodiment, the virtualization switch device 200 manages the virtual disk space 250 while the virtualization switch device 300 manages the virtual disk space 350. The virtualization switch devices 250 and 350 have virtual volumes. It is assumed that a virtual volume (VVOLS) 251 and a virtual volume (VVOLD) 252 are defined in the virtual disk space 250 while a virtual volume (VVOLS) 351 and a virtual volume (VVOLD) 352 are defined in the virtual disk space 350 here. The data storage areas of the storage devices 501 and 502 corresponding to the virtual volume (VVOLS) 251 corresponds to the data storage areas of the storage devices 501 and 502 corresponding to the virtual volume (VVOLS) 351. The data storage area of the storage devices 501 and 502 corresponding to the virtual volume (VVOLD) 252 corresponds to the data storage areas of the storage devices 501 and 502 corresponding to the virtual volume (VVOLD) 352.

The virtualization switch devices 200 and 300 of this embodiment are redundantly connected within the storage system. Even if the host apparatus 100 accesses a virtual volume managed by any one of the virtualization switch devices 200 and 300, the data obtained from the storage devices 501 and 502 must be identical, and the data must be written to the identical destination in the storage devices 501 and 502. According to this embodiment, the virtual volume (VVOLS) 251 and the virtual volume (VVOLS) 351 correspond, and the virtual volume (VVOLD) 252 and the virtual volume (VVOLD) 352 correspond. The source virtual volume of the snapshot processing of this embodiment is assumed as the virtual volume (VVOLS) 251. The destination virtual volume of the snapshot processing of this embodiment is assumed as the virtual volume (VVOLD) 252.

The bitmap information storage unit 400 stores bitmap information 410. The bitmap information 410 is status information indicative of progress of the copying. The bitmap information 410 is information for managing the state of progress of the snapshot processing in connection with each bit placed on a map. The snapshot processing is processing of storing (backing up) the state at a certain point of time of the data stored in a storage device to a different area. Each bit is associated with a unit storage area resulting from the division of a virtual volume into storage areas each in a predetermined size. The bitmap information 410 in FIG. 1 shows a bitmap graphically. Each rectangle of the bitmap information 410 represents each bit. Each bit changes the state according to whether the snapshot processing on the unit storage area corresponding to the bit ends or not. For example, a shaded bit 411 within a rectangle may indicate that the snapshot processing on the unit storage area corresponding to the bit 411 has ended. On the other hand, an unshaded bit 412 within a rectangle may indicate that the snapshot processing on the unit storage area corresponding to the bit 412 has not ended. In the same manner, the bit having a value 0 may indicate that the snapshot processing has ended while the bit having a value 1 may indicate that the snapshot processing has not ended.

The bitmap information 410 is used in executing the snapshot processing on data in the storage devices 501 and 502 corresponding to a virtual volume by the virtualization switch devices 200 and 300. The virtualization switch devices 200 and 300 share the bitmap information 410.

Figure 2:
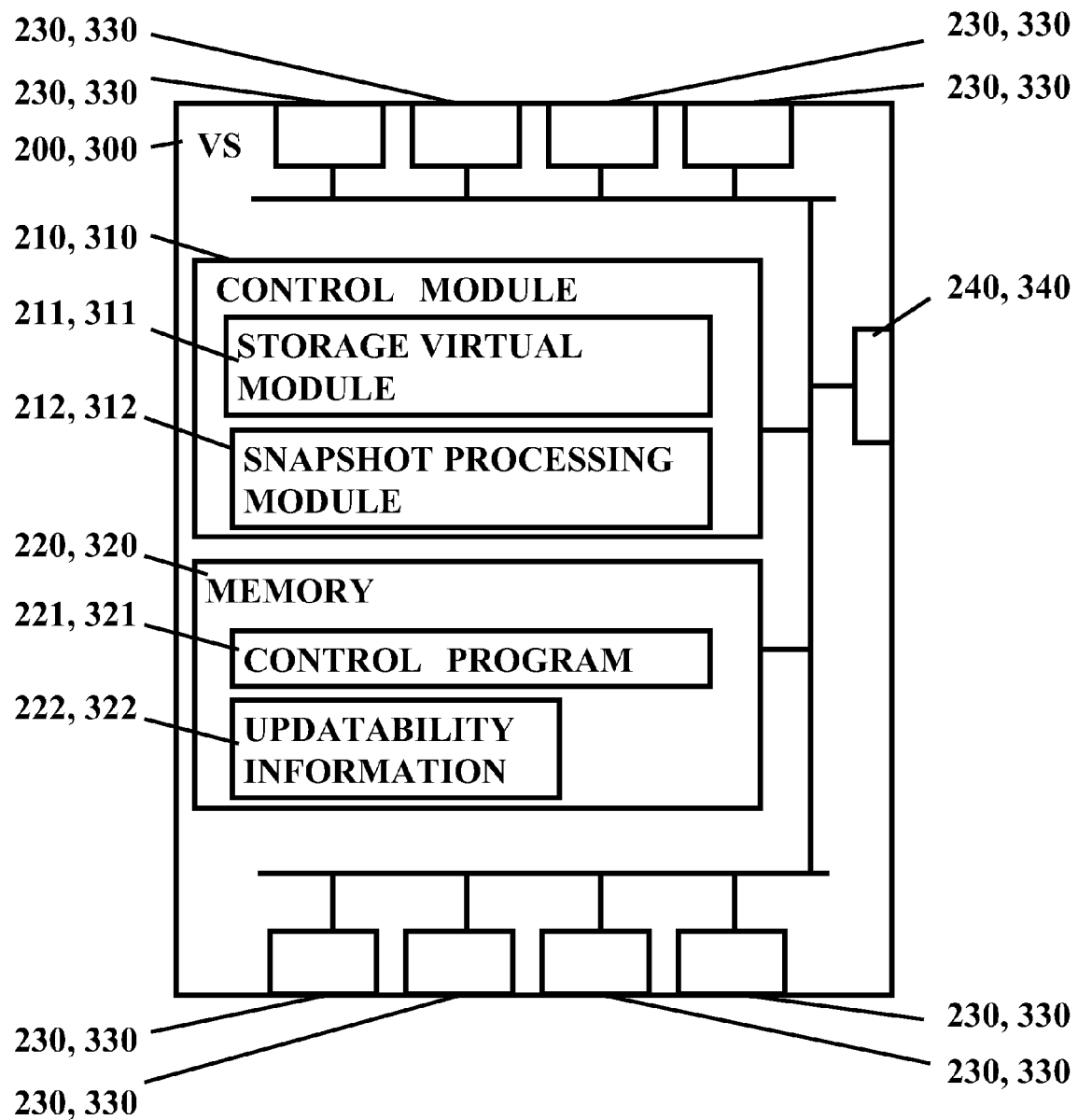
FIG. 2 shows a virtualization switch device according to the embodiment.

Next, the virtualization switch devices 200 and 300 will be described. The virtualization switch devices 200 and 300 in the storage system of this embodiment are connected such that the communication path between the host apparatus and the storage devices can have a redundant relationship. The expression "redundant relationship" refers to a state that the communication path between the host apparatus and the storage apparatus can be secured by one virtualization switch device even if the other virtualization switch device is failed. Since the virtualization switch devices 200 and 300 virtualize the storage devices, the host apparatus 100 accesses a virtual volume. Therefore, the virtual volume managed by the virtualization switch devices 200 and 300 must have correspondence between the virtualization switch devices 200 and 300. FIG. 2 is a diagram showing a configuration of the virtualization switch device 200 of this embodiment. Notably, the virtualization switch device 300 also has the configuration shown in FIG. 2, and the reference numerals in parentheses are reference numerals for the virtualization switch device 300.

The virtualization switch device 200 of this embodiment has a control module 210, a memory 220, a fibre channel connecting terminal 230 and an inter-virtualization-switch-device connecting terminal 240. The virtualization switch device 300 of this embodiment has a control module 310, a memory 320, a fibre channel connecting terminal 330 and an inter-virtualization-switch-device connecting terminal 340. The configuration of the virtualization switch device 200 will be described below.

The control module 210 may be a central processing unit (or CPU) or other operation unit and executes a program stored in the memory 220. The control module 210 functions by executing as a managing module for managing a first storage area and a second storage area including storage areas of the storage devices. The control module 210 functions by executing as a transmitting module for transmitting the notification of execution of processing of copying data stored in the first storage area to the second storage area to the other switch device. The control module 210 functions by executing as a coping module for coping data stored in the first storage area to a second storage area. The control module 210 functions by executing as a stopping module for stopping the execution of copying if a request for accessing the first storage area or the second storage area is received from the other switch device during the execution of the copying. The control module 210 functions by executing as a receiving module for receiving the notification of execution of processing of copying from the other switch device. The control module 210 functions by executing as a second transmitting module for transmitting a request for the access to the other switch device in order to access the first storage area or the second storage area during execution of the copying by the other switch device. The control module 210 functions by executing as a accessing module for accessing the first storage area or the second storage area after the other switch device stops the execution of the copying.

The memory 220 may be a data readable/writable memory (or RAM) or a data read-only memory (or ROM). The memory 220 stores a control program 221 to be executed by the control module 210. The control program 221 is a program causing the control module 210 to perform the virtualization processing on the storage devices 501 and 502 and the snapshot processing on data. The control module 210 executes the control program 221 to function as a storage virtualization module 211 and a snapshot processing module 212. The memory 220 has updatability information 222. The updatability information 222 is information describing whether the virtualization switch device 200 can update the bitmap information 410 or not.

The fibre channel connecting terminal 230 is a terminal that connects the virtualization switch device 200 to the host apparatus 100 and the storage devices 501 and 502 via a fibre channel. The virtualization switch device 200 connects to the virtualization switch device 300 via the fibre channel from the fibre channel connecting terminal 230.

The inter-virtualization-switch-device connecting terminal 240 is a terminal for connecting between the virtualization switch devices 200 and 300. The virtualization switch devices 200 and 300 may be connected over the LAN 602, for example. Multiple inter-virtualization-switch-device connecting terminals 240 may be provided in the virtualization switch device 200 for higher fault tolerance. The virtualization switch devices 200 and 300 are capable of controlling access to the physical data storage areas of the storage devices 501 and 502.

The storage virtualization module 211 executes the virtualization of data storage areas in the storage devices 501 and 502 connecting to the virtualization switch device 200. The storage virtualization module 211 creates and manages a virtual disk space by combining a part or all of the data storage areas in the multiple storage devices 501 and 502. For example, a manger of the storage system may define a partial data storage area of the virtual disk space as a virtual volume. The storage virtualization module 211 causes the host apparatus 100 to recognize the virtual volume.

The storage virtualization module 211 manages information associating the host apparatus 100 and the virtual volume and information associating the virtual volume and the data storage area in the storage device 501 or 502. Based on the information, the storage virtualization module 211 accesses the data storage area in the storage devices 501 and 502 corresponding to the accessed virtual volume according to the access to the virtual volume from the host apparatus 100.

The storage virtualization module 211 in the virtualization switch device 200 manages a virtual disk space 250 obtained from the storage device 501 and 502. The storage virtualization module 211 manages a virtual volume (VVOLS) 251 and a virtual volume (VVOLD) 252 within the virtual disk space 250. The storage virtualization module 311 in the virtualization switch device 300 manages a virtual disk space 350 obtained from the storage devices 501 and 502. The storage virtualization module 311 in the virtualization switch device 300 manages a virtual volume (VVOLS) 351 and a virtual volume (VVOLD) 352 within the virtual disk space 350. The data storage area in the storage devices 501 and 502 corresponding to the virtual disk space 250 is identical to the data storage area in the storage devices 501 and 502 corresponding to the virtual disk space 350.

Next, the snapshot processing module 212 in the control module 210 will be described.

The snapshot processing may be executed periodically or by an instruction from a manager of the storage system. The snapshot processing module 212 executes the snapshot processing periodically or if an instruction to start the execution of the snapshot processing is obtained from the host apparatus 100 or a management server, not shown, of the storage system 1. The snapshot processing of this embodiment refers to processing of copying the state of data at a certain point of time in the storage devices 501 and 502 corresponding to a specific virtual volume to a data storage area in the storage devices 501 and 502 corresponding to a different virtual volume. In the snapshot processing, the virtualization switch device 200 or 300 executes the copy of real data from a data storage area in the storage devices 501 and 502 corresponding to the virtual volume (VVOLS) 251 to a data storage area in the storage devices 501 and 502 corresponding to the virtual volume (VVOLD) 252. The virtualization switch device 200 or 300 notifies the completion of the copy to the host apparatus 100 without waiting for the completion of the copy of the real data. After the notification of the completion of the copy, the virtualization switch device 200 executes processing of copying data being a subject of the snapshot processing. The snapshot processing module 212 executes the snapshot processing. In the snapshot processing, the snapshot processing module 212 stores the data at a specific point of time stored in a first volume to a second volume.

Notably, the snapshot processing module 212 returns the notification of the completion of the snapshot processing if the instruction to start the execution of the snapshot processing is obtained even before the copy of the data storage area to undergo the snapshot processing completes. Therefore, the host apparatus 100 can access each virtual volume even during the snapshot processing by the virtualization switch device 200 or 300. However, the access from the host apparatus 100 to the storage device 501 and 502 corresponding to the virtual volume (VVOLD) 252 must be performed after the completion of the copy processing on the data in the storage devices 501 and 502.

The snapshot processing module 212 performs the snapshot processing based on the bitmap information 410. The snapshot processing module 212 performs an exclusive control over the bitmap information 410 between the virtualization switch devices 200 and 300. The snapshot processing module 212 performs the processing based on the type of the access from the host apparatus 100 if any during the snapshot processing.

Next, the snapshot processing in this embodiment will be described. In the storage system of this embodiment, the virtualization switch devices 200 and 300 share one piece of bitmap information 410. If the virtualization switch devices 200 and 300 update the bitmap information 410 simultaneously, the bitmap information may be inconsistent. The inconsistency of the bitmap information is caused by a difference between the time required for updating the bits of the bitmap information 410 and the time required for copying data stored in the storage devices 501 and 502 corresponding to the virtual volume. According to this embodiment, the virtualization switch device that updates the bitmap information 410 is identified by exclusive processing so that one virtualization switch device can only update the bitmap information 410.

According to this embodiment, the virtualization switch device 200 mainly performs the snapshot processing. The source of the data being a subject of the snapshot processing is the storage devices 501 and 502 corresponding to the virtual volume (VVOLS) 251, and the destination of the data being a subject of the snapshot is the storage devices 501 and 502 corresponding to the virtual volume (VVOLD) 252. The storage devices 501 and 502 corresponding to the virtual volume (VVOLD) 252 has a storage area that can store data in the storage devices 501 and 502 corresponding to the virtual volume (VVOLS) 251. The storage system of this embodiment is assumed as a system that configures the virtualization switch device 200 to function as a mainly operating virtualization switch device and the virtualization switch device 300 to function as a supplementarily operating virtualization switch device. For example, the host apparatus 100 normally accesses the storage devices 501 and 502 through the virtualization switch device 200. The host apparatus 100 accesses through the virtualization switch device 300 if the response time to the access through the virtualization switch device 200 is long.

Since the control module 310, memory 320, fibre channel connecting terminal 330 and inter-virtualization-switch-device connecting terminal 340 in the virtualization switch device 300 correspond to the control module 210, memory 220, fibre channel connecting terminal 230 and inter-virtualization-switch device connecting terminal 240 in the virtualization switch device 200, respectively, the description will be omitted here. Since the storage virtualization module 311, snapshot processing module 312 and control program 321 correspond to the storage virtualization module 211, snapshot processing module 212 and control program 221, respectively, the description will be omitted here.

Figure 3:
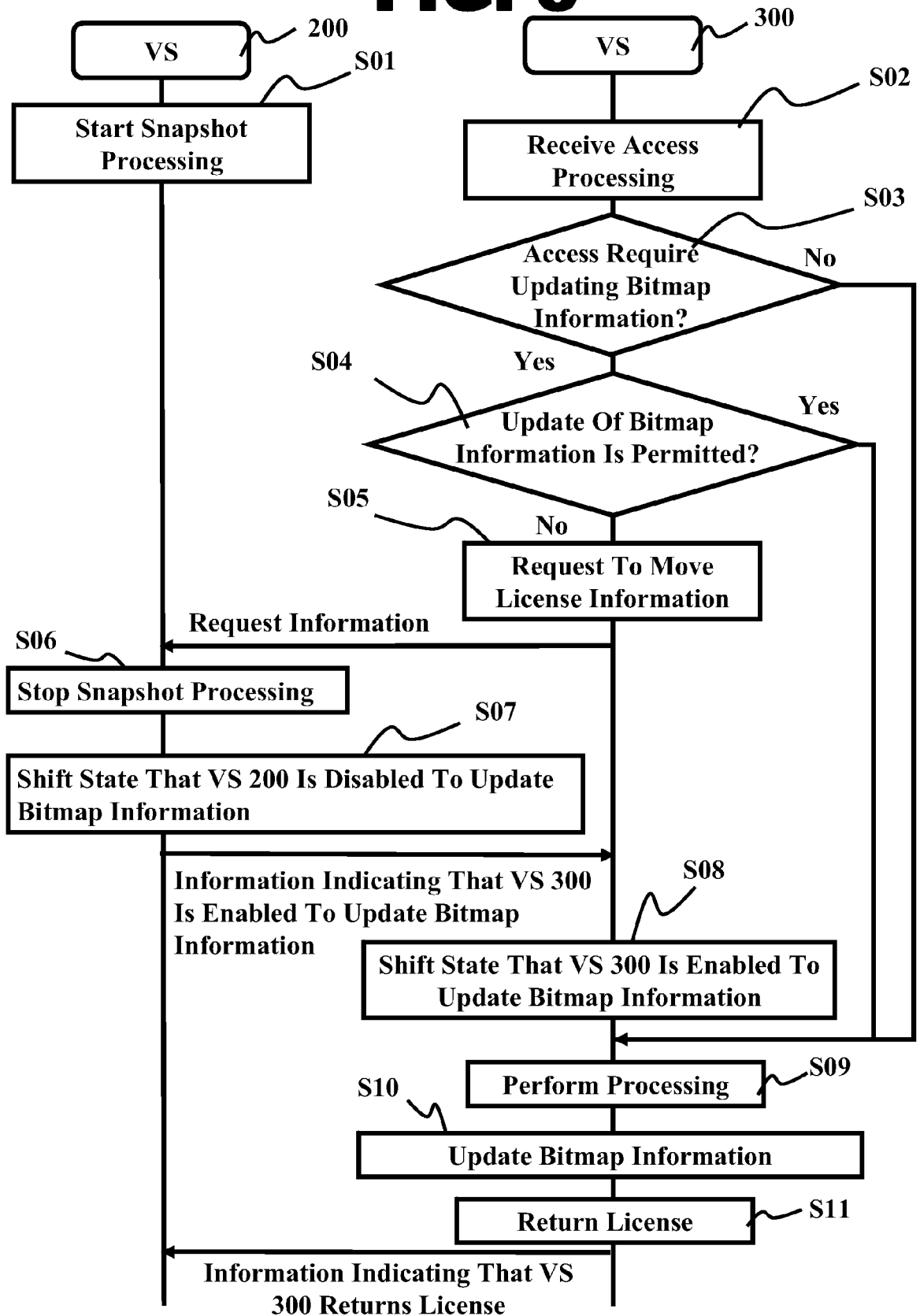
FIG. 3 is a sequence diagram of an operation in snapshot processing by the virtualization switch devices.

FIG. 3 is a sequence diagram for an operation of the snapshot processing in the virtualization switch devices 200 and 300. The virtualization switch device 200 receives a request for the snapshot processing from the host 100. The virtualization switch device 200 transmits notification of initiation of snapshot processing. The virtualization switch devices 300 refers to the bitmap information 410 when the virtualization switch devices 300 receives a request for access to VVOLS 351 and VVOLD 352 by the host 100 before completion of the snapshot processing. The virtualization switch devices 300 determines whether to permit access to the VVOLS 351 and the VVOLD 352. FIG. 3 shows the processing in a case where the virtualization switch device 200 mainly performs the snapshot processing and the host apparatus 100 accesses the virtualization switch device 300 without any access from the host apparatus 100 to the virtualization switch device 200 since the snapshot processing is started.

The control module 210 in the virtualization switch device 200 starts the snapshot processing (S01). It is assumed that the updatability information 222 in the memory 220 of the virtualization switch device 200 indicates that the bitmap information 410 is unupdatable. It is assumed that the updatability information 322 in the memory 320 of the virtualization switch device 300 indicates that the bitmap information 410 is unupdatable.

If a command to start the snapshot processing is received from the host apparatus 100, for example, the control module 210 of the virtualization switch device 200 creates the bitmap information 410 and notifies the completion of the snapshot processing to the host apparatus 100. The control module 210 executes the processing of copying the data corresponding to the snapshot processing. The control module 210 establishes correspondence between unit storage areas resulting from the division of the data storage areas of the storage devices 501 and 502 corresponding to the virtual volume (VVOLD) 252 into areas each in a predetermined size and the bits of the bitmap information 410. The control module 210 causes each of the bits of the bitmap information 410 to initially have a value indicative of the state that the copy on the unit storage area has not completed. The control module 210 copies the data stored in the data storage area in the storage devices 501 and 502 corresponding to the virtual volume (VVOLS) 251 to the data storage area in the storage devices 501 and 502 corresponding to the virtual volume (VVOLD) 252. The control module 210 updates the bits of the bitmap information 410 corresponding to the unit storage area after the completion of the copying with a value indicative of the state that the copying on the unit storage area has completed. The virtualization switch device 200 transmits information that the snapshot processing has started to the virtualization switch device 300 over the LAN 602. The control module 210 performs the copy processing until the copy of data has entirely completed from the data storage area in the storage devices 501 and 502 corresponding to the virtual volume (VVOLS) 251 to the data storage area in the storage devices 501 and 502 corresponding to the virtual volume (VVOLD) 252. The information that the snapshot processing has started may include source virtual volume information, destination virtual volume information and information on the place where the corresponding bitmap information 410 is stored. The storage system includes one piece of bitmap information 410 for one snapshot process. Therefore, the place where the bitmap information 410 is stored must be located. The virtualization switch devices 200 and 300 can exclusively perform the snapshot processing by accessing to the located place where the bitmap information 410 is stored. The virtualization switch device 200 and virtualization switch device 300 manage multiple virtual volumes. Therefore, the source virtual volume information and destination virtual volume information must be identified. The virtualization switch devices 200 and 300 can perform the snapshot processing by identifying the source virtual volume information and destination virtual volume information among multiple virtual volumes.

It is assumed here that the host apparatus 100 has accessed the virtualization switch device 300. The control module 310 in the virtualization switch 300 receives an access processing instruction on a virtual volume managed by the virtualization switch device 300 from the host apparatus 100 during the snapshot processing performed by the control module 210 in the virtualization switch device 200 (S02).

The control module 310 in the virtualization switch device 300 determines whether the access from the host apparatus 100 to the data requires updating the bitmap information 410 or not (S03). The access requiring updating the bitmap information 410 may be (1) an access for processing (write processing) of writing data to a data storage area in the storage devices 501 and 502 corresponding to a source virtual volume (VVOLS) during snapshot processing, which is an area on which copy processing has not been performed, (2) an access for processing (write processing) of writing data to a data storage area in the storage devices 501 and 502 corresponding to a destination virtual volume (VVOLD) during snapshot processing, which is an area on which copy processing has not been performed or (3) an access for processing (read processing) of reading out data in a data storage area in the storage devices 501 and 502 corresponding to the destination virtual volume (VVOLD) during snapshot processing, which is an area on which copy processing has not been performed.

If the access from the host apparatus 100 does not require updating the bitmap information 410 (S03: No), the control module 310 in the virtualization switch device 300 performs processing according to the access (S09). On the other hand, if the access from the host apparatus 100 requires updating the bitmap information 410 (S03: Yes), the control module 310 in the virtualization switch device 300 determines whether the virtualization switch device 300 can update the bitmap information 410 or not (S04). The control module 310 determines the updatability of the bitmap information 410 by the virtualization switch device 300 based on the updatability information 322. The right to update the bitmap information 410 is defined as a license in the description below. Holding the license by a virtualization switch device means that the update of the bitmap information by the virtualization switch device is permitted, and the updatability information stored in the virtualization switch device has a state that the update of the bitmap information 410 is permitted. Not holding the license by a virtualization switch device means that the virtualization switch device cannot update the bitmap information, and the updatability information stored in the virtualization switch device has a state that the update of the bitmap information 410 is not permitted.

If the update of the bitmap information 410 is permitted (S04: Yes), the control module 310 of the virtualization switch device 300 performs processing for the access from the host apparatus 100 (S09). In order to move to the step that the virtualization switch device 300 is enabled to update the bitmap information 410 in step S05, the virtualization switch device 300 must further receive an access from the host apparatus 100 during the processing of the access from the host apparatus 100 by the virtualization switch device 300.

On the other hand, if the updatability information 322 indicates that the bitmap information 410 cannot be updated (S04: No), the control module 310 of the virtualization switch device 300 requests the virtualization switch device 200 to move the license information allowing the update of the bitmap information (S05). Moving the license information specifically means that disabling the update of the bitmap information 410 in the virtualization switch device 200 and enabling the update of the bitmap information 410 in the virtualization switch device 300.

If a request to move the license is received from the virtualization switch device 300, the control module 210 in the virtualization switch device 200 holding the license stops the snapshot processing (S06). The snapshot processing may be stopped when the copy of the unit storage area corresponding to the bit of the bitmap information 410 completes. In other words, the snapshot processing by the virtualization switch device 200 does not stop until the copy on an arbitrary unit storage area completes. The control module 210 in the virtualization switch device 200 shifts the updatability information 222 to a state that the virtualization switch device 200 is disabled to update the bitmap information 410 (S07). The control module 210 transmits the information indicating that the virtualization switch device 300 is enabled to update the bitmap information 410 to the virtualization switch device 300. The control module 310 in the virtualization switch device 300 receives the information indicating that the bitmap information 410 is updatable from the virtualization switch device 200 and then shifts the updatability information 322 to the state that the virtualization switch device 300 is enabled to update the bitmap information 410 (S08). The control module 310 in the virtualization switch device 300 performs processing on the access from the host apparatus 100 (S09).

Upon completion of the execution of the processing for the access from the host apparatus 100, the control module 310 in the virtualization switch device 300 updates the bits of the bitmap information 410 (S10). The bits corresponding to the data area accessed from the host apparatus 100 are the subject of the update. The control module 310 in the virtualization switch device 300 returns the license to the virtualization switch device 200 (S11). The return of the license may be the notification of the completion of the processing, for example. The control module 310 in the virtualization switch device 300 returns the license to the virtualization switch device 200 if the movement of the license is requested from the virtualization switch device 300 in S05.

In the storage system, the snapshot processing can be continuously performed by the virtualization switch device 300. If the virtualization switch device 300 continuously performs the snapshot processing, the control module 310 continuously performs the snapshot processing from the area on which the copy processing has not completed with reference to the bitmap information 410.

The control module 310 in the virtualization switch device 300 shifts the updatability information 322 to the state that the virtualization switch device 300 is disabled to update the bitmap information 410. The control module 310 transmits the information indicating that the virtualization switch device 200 is enabled to update the bitmap information 410 to the virtualization switch device 200. The control module 210 in the virtualization switch device 200 receives the information indicating that the virtualization switch device 200 is enabled to update the bitmap information 410 and then shifts the updatability information 222 to the state that the virtualization switch device 200 is enabled to update the bitmap information 410. The control module 210 performs the subsequent steps of the snapshot processing based on the bitmap information 410. The virtualization switch device 200 upon completion of the snapshot processing transmits information that the snapshot processing has completed to the virtualization switch device 300 over the LAN 602.

The processing has been described in a case with two virtualization switch devices. In a case with three or more virtualization switch devices, the acquisition of the license may be requested to the virtualization switch device which holds the license.

Next, the processing for an access from the host apparatus 100 will be described which is to be performed by the control module 210 and the control module 310. The accesses from the host apparatus 100 during the snapshot processing are classified based on whether the access is to the source virtual volume (VVOLS) or the destination virtual volume (VVOLD), whether the access is to the area on which the snapshot processing has completed or not and/or whether the access is for write processing or read processing.

Figure 4:
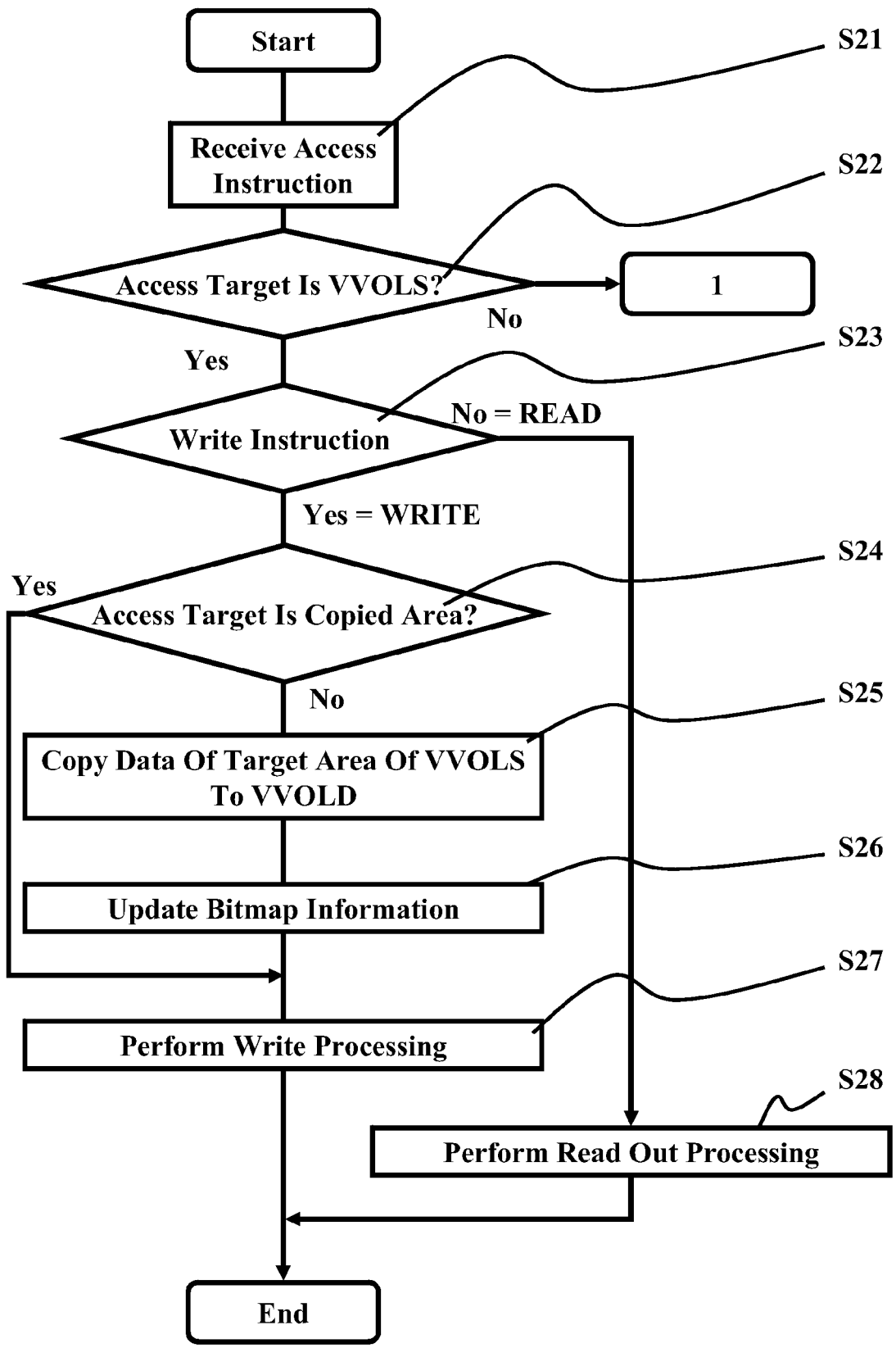
FIG. 4 is a flowchart of the processing on an access during the snapshot processing performed by a control module.
Figure 5:
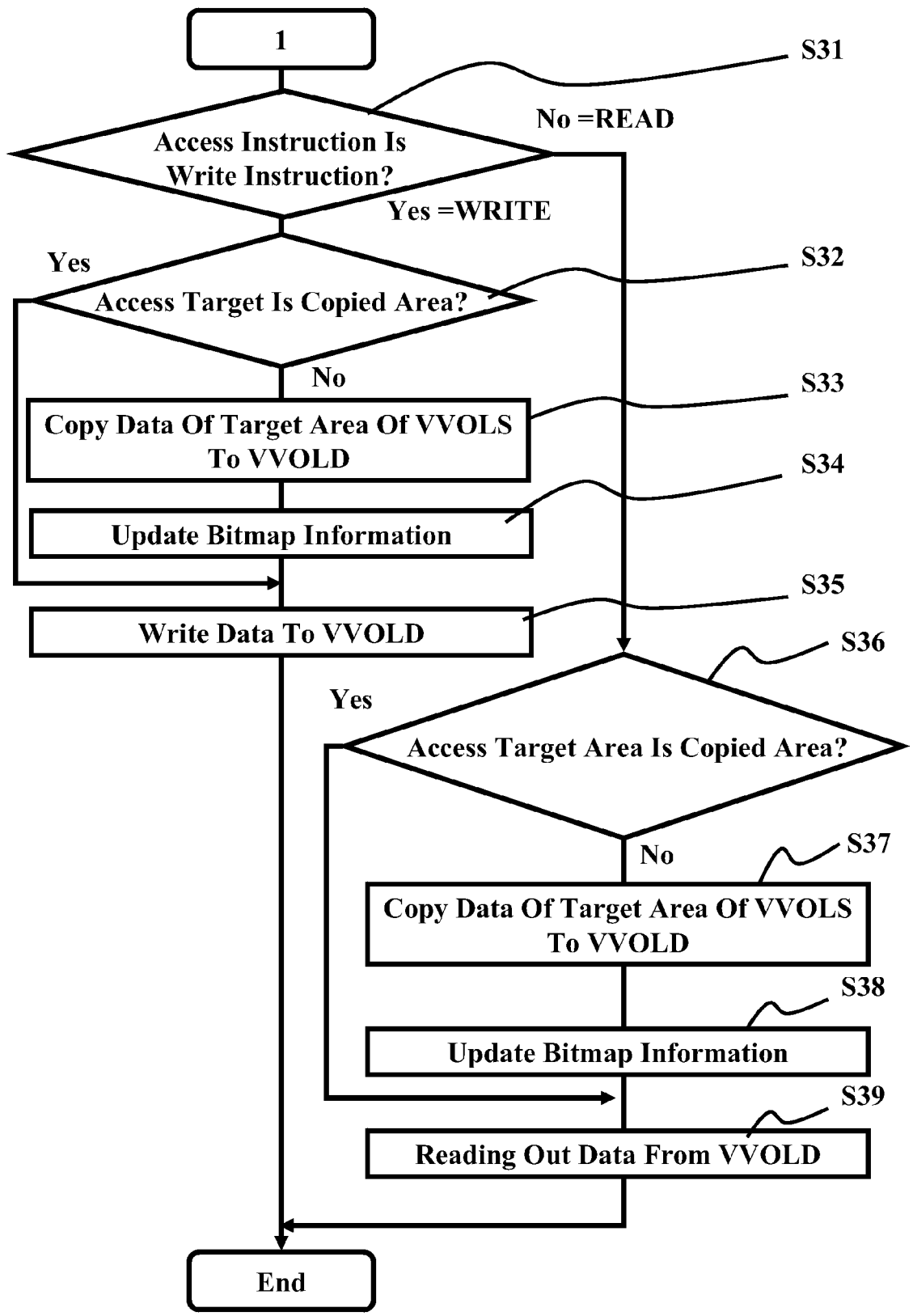
FIG. 5 is a flowchart of the processing on an access during the snapshot processing performed by the control module.

FIGS. 4 and 5 are flowcharts of the processing for an access from the host apparatus 100 during the snapshot processing performed by the control module 210 or control module 310. FIGS. 4 and 5 are flowcharts for the processing in a case where the virtualization switch device 200 mainly performs the snapshot processing and the host apparatus 100 accesses the virtualization switch devices 200 and 300.

The control module 210 or 310 can determine whether the access from the host apparatus 100 requires the update of the bitmap information 410 or not based on the flowcharts in FIGS. 4 and 5. The access from the host apparatus 100 includes information identifying a target volume, information determining either Write command or Read command, address information of the area to be accessed and information on subject data of Write processing. A Write instruction is an instruction to store data to a storage area, and a Read instruction is an instruction to read out data stored in a storage area.

It is assumed that the processing on the flowcharts as will be described below is performed when the virtualization switch device 200 in the storage system receives an access from the host apparatus 100. Since the processing to be performed when the virtualization switch device 300 in the storage system receives an access from the host apparatus 100 is similar thereto, the description will be omitted herein.

The control module 210 receives an access instruction from the host apparatus 100 (S21). The control module 210 analyzes the type of the access instruction.

The control module 210 determines whether the target of the access is either virtual volume (VVOLS) 251 or virtual volume (VVOLD) 252 based on the information identifying the volume to be accessed in the access instruction (S22). If the access is to the virtual volume (VVOLD) 252 (S22: No), the control module 210 performs processing in and after S31 in FIG. 5. On the other hand, if the access is to the virtual volume (VVOLS) 251 (S22: Yes), the control module 210 performs processing in and after S23.

The control module 210 determines whether the access instruction is a Write instruction or a Read instruction based on the information identifying either Write instruction or Read instruction in the access instruction (S23). If the access instruction is a Read instruction (S23: No), the control module 210 reads out the subject data of the access, which is stored in the data storage area in the storage devices 501 and 502 corresponding to the virtual volume (VVOLS) 251 (S28). If the data storage area in the storage devices 501 and 502 corresponding to the virtual volume (VVOLS) 251 stores the latest data and the access instruction is a Read instruction, the update of the bitmap information 410 is not necessary. On the other hand, if the access instruction is a Write instruction (S23: Yes), the control module 210 determines whether the snapshot processing on the area storing the subject data of the access has completed or not (S24). The area on which the snapshot processing has completed is called copied area. The control module 210 determines whether the target of the access is a copied area or not based on the value of the bit in the bitmap information 410 and the unit storage area.

If the target of the access is not the copied area (S24: No), the control module 210 copies the data in the unit storage area including the area to be accessed in the data storage areas in the storage devices 501 and 502 corresponding to the virtual volume (VVOLS) 251 to the data storage area in the storage devices 501 and 502 corresponding to the virtual volume (VVOLD) 252 (S25). The control module 210 updates the value of the bit in the bitmap information 410 corresponding to the unit storage area corresponding to the data storage area corresponding to the copied data (S26).

The control module 210 performs write processing (S27) after the bitmap information 410 is updated in S26 or the target of the access is the copied area (S24: Yes). The write processing writes data information being the subject of the Write processing in the access instruction to a position in the data storage area in the storage devices 501 and 502 corresponding to the virtual volume corresponding to the address information of the target area in the access instruction. For example, the control module 210 may locate the storage device corresponding to the address information in the virtualization module and the storage area within the storage device and writes the data information, which is the subject of Write processing.

If the control module 210 determines that the access is to the virtual volume (VVOLD) 252 in S22 in FIG. 4 (S22: No), the control module 210 performs processing in and after S31 in FIG. 5.

The control module 210 determines whether the access instruction is a Write instruction or a Read instruction based on the information identifying either Write instruction or Read instruction in the access instruction (S31).

If the access instruction is a Write instruction (S31: Yes), the control module 210 determines whether the area to be accessed is a copied area or not based on the address information of the area to be accessed (S32). The control module 210 determines whether the access target area is a copied area or not based on the bitmap information 410.

If the target of the access is not the copied area (S32: No), the control module 210 copies data in the unit storage area including the area to be accessed in the data storage area in the storage devices 501 and 502 corresponding to the virtual volume (VVOLS) 251 to the data storage area in the storage devices 501 and 502 corresponding to the virtual volume (VVOLD) 252 (S33). The control module 210 updates the bit of the bitmap information 410 corresponding to the data storage area of the copied data (S34). After the bitmap information 410 is updated in S34 or if the target of the access is the copied area (S32: Yes), the control module 210 performs the writing processing (S35).

If the access instruction is a Read instruction (S31: No), the control module 210 determines whether the area to be accessed is a copied area or not (S36). The control module 210 determines whether the access target area is a copied area or not based on the bitmap information 410.

If the access target area is not a copied area (S36: No), the control module 210 copies the data in the unit storage area including the access target area in the data storage area of the storage devices 501 and 502 corresponding to the virtual volume (VVOLS) 251 to the virtual volume (VVOLD) 252 (S37). The control module 210 updates the bit of the bitmap information 410 corresponding to the data storage area of the copied data (S38). After the bitmap information 410 is updated in S38 or if the target of the access is a copied area (S36: Yes), the control module 210 reads out the data to be accessed from the data storage area in the storage devices 501 and 502 corresponding to the virtual volume (VVOLD) 252 (S39).

The order of the determination in the processing in FIGS. 4 and 5 may be changed as required.

Figure 6:
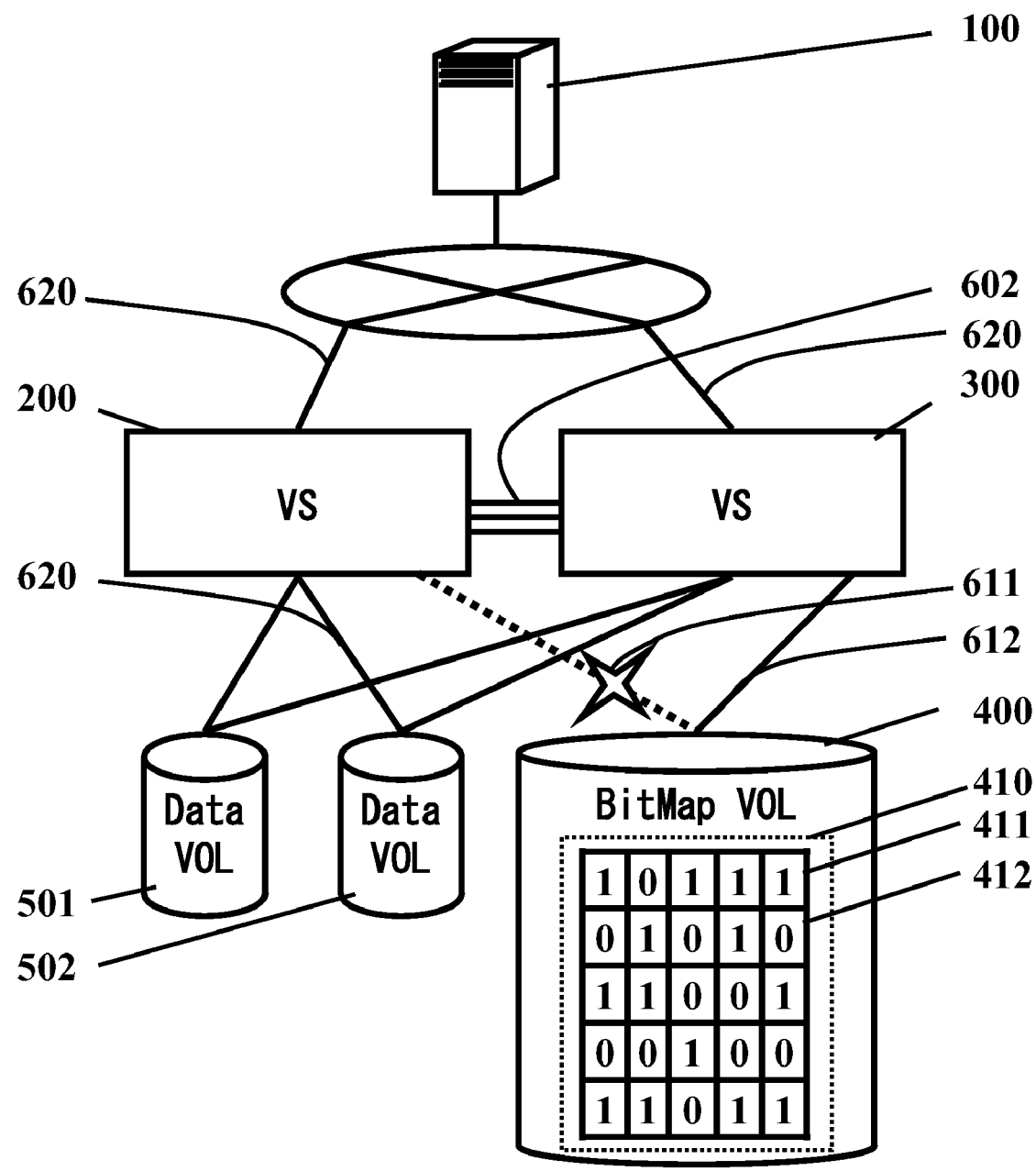
FIG. 6 shows the storage system having an abnormality on a path.

Next, the processing will be described in a case where the path between the virtualization switch device 200 functioning as a mainly operating virtualization switch device and the bitmap information storage unit 400 has an abnormality. FIG. 6 shows a storage system having an abnormality on a path 611. The storage system in FIG. 6 is assumed as a system causing the virtualization switch device 200 to function as a mainly operating virtualization switch device and the virtualization switch device 300 to function as a supplementarily operating virtualization switch device. The virtualization switch devices 200 and 300 have information for determining either mainly operating virtualization switch device or supplementarily operating virtualization switch device.

Figure 7:
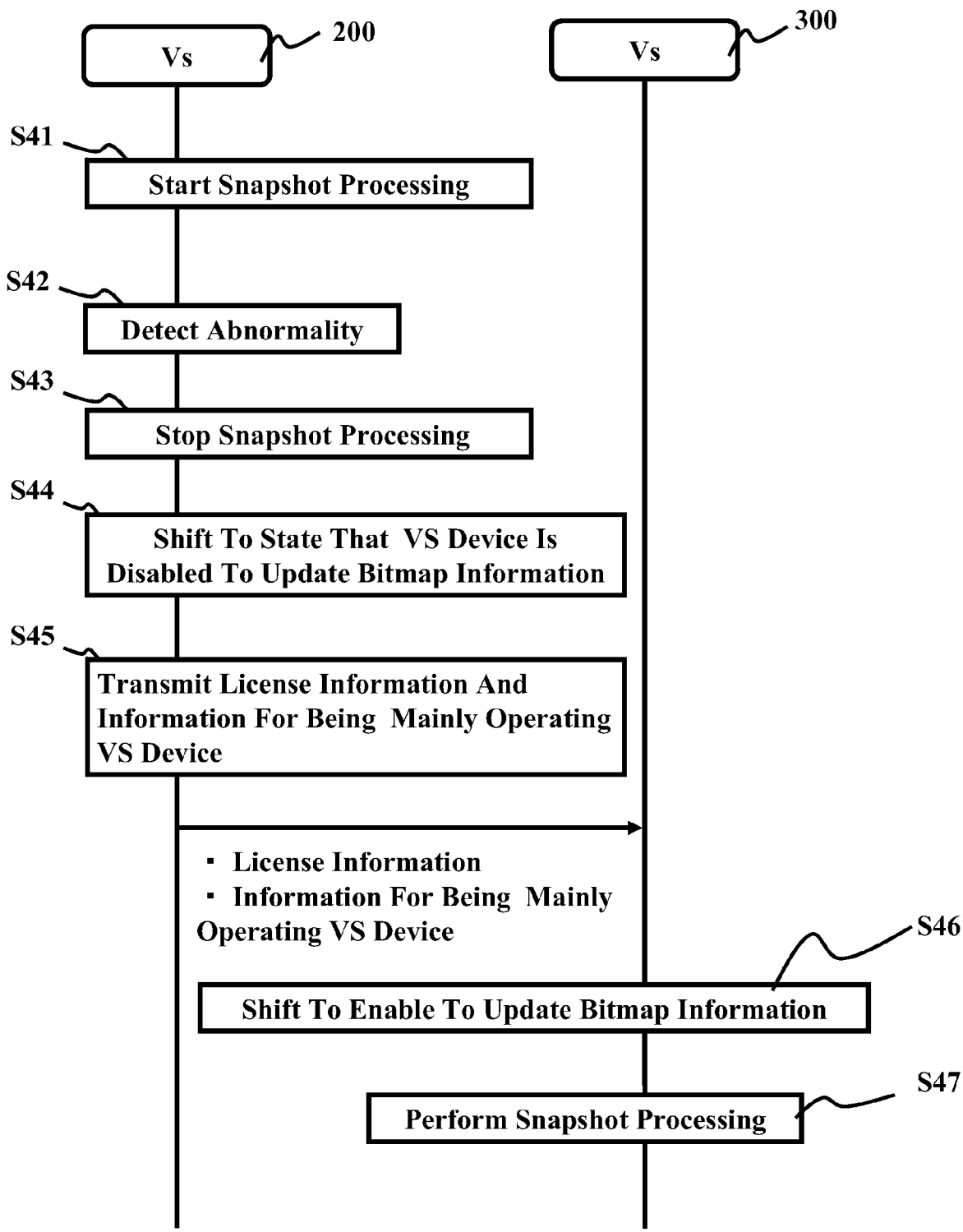
FIG. 7 is a sequence diagram of the processing in a case where the path has an abnormality.

FIG. 7 is a sequence diagram of processing in a case where the path 611 has an abnormality. The control module 210 of the virtualization switch device 200 starts snapshot processing (S41). However, since the path 611 connecting the virtualization switch device 200 and the bitmap information storage unit 400 has an abnormality, the control module 210 detects that writing or reading bit information of the bitmap information 410 is disabled (S42). Therefore, the control module 210 stops the snapshot processing (S43). The virtualization switch device 200 which is disabled to update the bitmap information 410 does not respond to an access from the host apparatus 100. The host apparatus 100 detects an error in the virtualization switch device 200 based on the no response from the virtualization switch device 200. The host apparatus 100 having detected an error in the virtualization switch device 200 subsequently accesses through a different virtualization switch device such as the virtualization switch device 300. The control module 210 after S43 shifts to a state that the virtualization switch device 200 is disabled to update the bitmap information 310 (S44). The control module 210 transmits information that the bitmap information 410 can be updated (license information) and information for being the mainly operating virtualization switch device to the virtualization switch device 300 (S45).

After the information that the bitmap information 410 can be updated and information for being the mainly operating virtualization switch device are received from the virtualization switch device 200, the control module 310 of the virtualization switch device 300 defines the virtualization switch device 300 as the mainly operating virtualization switch device, which is shifted to enable to update the bitmap information 410 (S46). The control module 310 performs the snapshot processing based on the bitmap information 410 (S47).

Figure 8:
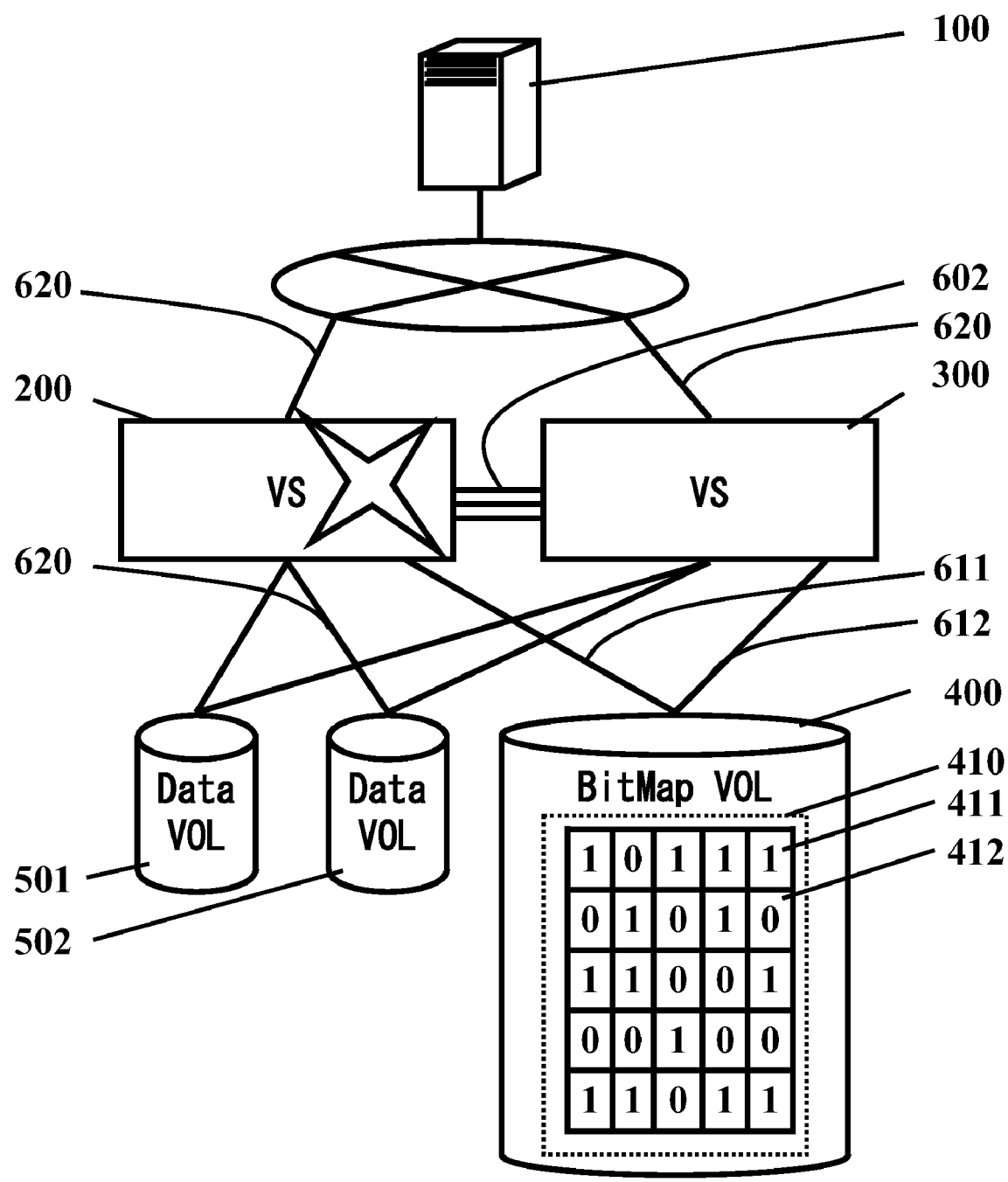
FIG. 8 shows the storage system having an abnormality in the virtualization switch device.

Next, an operation will be described in a case where the virtualization switch device 200 has an abnormality. FIG. 8 shows a storage system having an abnormality in the virtualization switch device 200. The storage system in FIG. 8 is assumed as a system causing the virtualization switch device 200 to function as a mainly operating virtualization switch device and the virtualization switch device 300 to function as a supplementarily operating virtualization switch device. The virtualization switch devices have information for determining either mainly operating virtualization switch device or supplementarily operating virtualization switch device.

The virtualization switch devices 200 and 300 may perform patrol processing periodically, for example. The patrol processing is processing of detecting an abnormality in operation among virtualization switch devices connected redundantly. For example, one virtualization switch device transmits patrol information to the other virtualization switch device for checking whether the other virtualization switch device is operating or not. The virtualization switch device having received the patrol information responds to the patrol information. The virtualization switch device having transmitted the patrol information receives the response to the patrol information to check the operation by the other virtualization switch device. The virtualization switch devices 200 and 300 exchange patrol information over a LAN or through a fibre channel, for example.

FIG. 9 is a sequence diagram of processing in a case where the virtualization switch device 200 has an abnormality. The control module 210 in the virtualization switch device 200 starts snapshot processing (S51).

The control module 310 in the virtualization switch device 300 transmits a patrol signal to the virtualization switch device 200 (S52). If the response is received from the virtualization switch device 200 (S53: Yes), the control module 310 exits the patrol processing. On the other hand, if no responses are received from the virtualization switch device 200 (S53: No), the control module 310 in the virtualization switch device 300 determines that the virtualization switch device 200 has an error. The control module 310 shifts the virtualization switch device 300 to a state that it is enabled to update the bitmap information without any involvement of the virtualization switch device 200 (S54). The control module 310 shifts the virtualization switch device 300 to the mainly operating virtualization switch device within the storage system.

There may be a case where it is not clear whether a detected abnormality if any occurs in the virtualization switch device 200 or on a communication path between the virtualization switch device 200 and the virtualization switch device 300. However, the virtualization switch device 200 and the virtualization switch device 300 are connected via multiple communication paths in order to improve the fault tolerance. Therefore, the possibility of occurrence of an abnormality on all communication paths between the virtualization switch device 200 and the virtualization switch device 300 is low. As a result, the virtualization switch device which does not respond in the patrol processing can be determined as failed.

Now, an operation will be described in a case where it is detected that a communication path between the virtualization switch device 200 and the virtualization switch device 300 has an abnormality. For example, if a communication path of the LAN 602 has an abnormality, the information indicating the updatability of the bitmap information 410 of one of the virtualization switch devices cannot be exchanged between the virtualization switch devices. Therefore, if, during the snapshot processing, the host apparatus 100 accesses the virtualization switch device 300 which supplementarily operates after the communication path has an abnormality, the control module 310 transmits an error response to the host apparatus 100. This is because an abnormality on a communication path may cause inconsistency in the update of the bitmap information since the other virtualization switch device is operating.

From the description above, the snapshot processing on a virtual volume can be performed even within a storage system having multiple virtualization switch devices connected via multiple paths.

According to another example of this embodiment, the storage system may have a management device that manages multiple virtualization switch devices. In this example, the management device selects the virtualization switch device which performs snapshot processing. In this case, the storage system is not required to have another management device separately.

The case in which virtualization switch devices are connected such that a host apparatus and storage devices can be connected through redundant paths in a storage system before the application of this embodiment has following problems. In a case where snapshot processing is performed by one virtualization switch device only, the other virtualization switch device is disabled to perform the processing for an access requiring the update of bitmap information during the snapshot processing. Also, in a case where each of the virtualization switch devices has independent bitmap information, the completion of the respective snapshot processing may not be recognized mutually. Furthermore, the execution of the processing of mutually synchronizing the bitmap information based on the states of the respective snapshot processing increases the complexity and time of the processing.

On the other hand, the cascade connection of virtualization switch devices allows the link of virtual volumes managed by the virtualization switch devices. In order for a host apparatus to access the virtualization switch device at a lower level of the cascade, the host apparatus must pass through the virtualization switch device at a higher level of the cascade. Therefore, the cascade connection allows the virtualization switch device at the higher level to manage accesses to a virtual volume of the virtualization switch device at the lower level, which can prevent the problems during snapshot processing. However, since all data between the host apparatus and storage devices are transferred through the virtualization switch device at the higher level, the virtualization switch device at the higher level has an excessively heavy load condition, which increases the response time. Furthermore, the cascade connection requires the use of fibre channel connecting terminals of the virtualization switch devices, which decreases the number of terminals for connecting to other host apparatus and storage devices.

Accordingly, it is an object of the aspect of an embodiment to provide a method allowing execution of update of data through switch devices properly in a system having multiple switch devices which virtualize multiple storage devices.

According to the aspect of the invention, there is provided a control method for storage system having a first switch device, a second switch device and multiple storage devices connected over a network, each of the first switch device and the second switch device having a virtual storage area including storage areas of the multiple storage devices, the method including the steps of transmitting notification of execution of copy processing to be performed on data in the virtual storage area to the second switch device by the first switch device, copying data stored in a first storage area of the virtual storage area to a second storage area of the virtual storage area by the first switch device, stopping the execution of copying by the first switch device if a request for accessing the first storage area or the second storage area is received from the second switch device during the execution of copying, and accessing the first storage area or the second storage area by the second switch device after the first switch device stops the execution of copying.

According to the aspect of the invention, the first switch device stops the execution of copying if the first switch device receives a request for accessing the first storage area or the second storage area from the second switch device during the copy of data stored in the first storage area to the second storage area in the virtualization storage area. After that, the second switch device accesses the first storage area or second storage area. As a result, the copy processing can be exclusively performed between the first switch device and the second switch device, and the switch devices can perform the update of data properly.

Although a few preferred embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling a storage system having a first switch device, a second switch device and at least one storage device connected to the first and second switch devices, the storage device having first and second storage areas, each of the first switch device and the second switch device being capable of controlling access to the first storage area and the second storage area of the storage device, the first switch device and the second switch device have updatability information including updatability of status information, and the second switch device changes the updatability information to a state describing that an update of the status information is uppermitted after the access is executed, the method comprising:

receiving a request for copying data stored in the first storage area to the second storage area from a host;

transmitting notification of initiation of copying for copying data stored in the first storage area to the second storage area from the first switch device to the second switch device;

executing the copying by the first switch device;

controlling the second switch to refer to status information indicative of progress of the copying upon receiving a request for access to the first or second storage area by the host before completion of the copying;

determining whether to permit access to the first or second storage area by the second switch device on the basis of the status information;

determining whether the access requires the update of the status information by the second switch device;

transmitting the request for accessing from the second switch device to the first switch device when the access requires the update of the status information;

transmitting a request for obtaining the updatability information from the second switch device to the first switch device upon accessing;

executing the copying by the first switch device intermittently;

changing the updatability information to the state describing that the status information is not updatable by the first switch device; and transmitting information permitting the update of the status information from the first switch device to the second switch device.

2. The method according to claim 1, wherein the second switch device determines that the access requires the update of the status information if the access is for processing of writing data in an area on which the copying has not been performed in the first storage area, processing of writing data in an area on which the copying has not been performed in the second storage area or processing of reading out data in an area on which the copying has not been performed in the second storage area.

3. A switch device to be connected to a plurality of storage devices and another switch device over a network, comprising:

a managing module to manage a first storage area and a second storage area including storage areas of the plurality of storage devices;

a transmitting module to transmit a notification of execution of processing of copying data stored in the first storage area to the second storage area to another switch device, the switch device and the another switch device have updatability information including updatability of the status information, and the another switch device changes the updatability information to a state describing that the update of the status information is unpermitted after the access is executed;

a copying module to copy data stored in the first storage area to a second storage area;

a stopping module to stop the execution of copying if a request for accessing the first storage area or the second storage area is received from the another switch device during the execution of the copying;

a receiving module to receive the notification of execution of processing of copying from the another switch device, a second transmitting module to transmit a request for the access to the another switch device in order to access the first storage area or the second storage area during execution of the copying by the another switch device, and an accessing module to access the first storage area or the second storage area after the another switch device stops the execution of the copying;

a determining module to whether the access requires an update of a status information by the another switch device;

transmitting a request for obtaining the updatability information from the another switch device to the switch device upon accessing;

executing the copying by the switch device intermittently;

changing the updatability information to the state describing that the status information is not updatable by the switch device; and transmitting information permitting the update of the status information from the switch device to the another switch device.

4. A storage system comprising:

a plurality of storage devices connected over a network, each of the plurality of storage devices having storage area;

a first switch device to manage a first storage area and a second storage area including the storage areas of the plurality of storage devices;

a second switch device to manage a first storage area and a second storage area including the storage areas of the plurality of storage devices, the first switch device and the second switch device have updatability information including the updatability of status information, and the second switch device changes the updatability information to a state describing that an update of the status information is unpermitted after access is executed; and the first switch device executes a process comprising, transmitting the notification of execution of processing of copying data stored in the first storage area to the second storage area to the second switch device, copying data stored in the first storage area to the second storage area, and stopping the execution of copying if a request for accessing the first storage area or the second storage area is received from the second switch device during the execution of the copying, and the second switch device executes a process comprising, receiving the notification from the first switch device, transmitting a request for the access to the first switch device in order to access the first storage area or the second storage area during execution of the copying by the first switch device, and accessing the first storage area or the second storage area after the first switch device stops the execution of the copying, determining whether the access requires the update of the status information by the second switch device, transmitting the request for accessing from the second switch device to the first switch device when the access requires the update of the status information, transmitting a request for obtaining the updatability information from the second switch device to the first switch device upon accessing, executing the copying by the first switch device intermittently, changing the updatability information to the state describing that the status information is not updatable by the first switch device and transmitting information permitting the update of the status information from the first switch device to the second switch device.

* * * * *